United States Patent
Saxena et al.

(10) Patent No.: US 9,256,617 B2
(45) Date of Patent: Feb. 9, 2016

(54) APPARATUS AND METHOD FOR PERFORMING VISUAL SEARCH

(71) Applicant: Samsung Electronics Co., LTD, Suwon-si, Gyeonggi-do (KR)

(72) Inventors: Ankur Saxena, Dallas, TX (US); Serhat Bucak, Lansing, MI (US); Abhishek Nagar, Garland, TX (US); Felix Carlos Fernandes, Plano, TX (US); Gaurav Srivastava, Dallas, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 140 days.

(21) Appl. No.: 13/929,506

(22) Filed: Jun. 27, 2013

(65) Prior Publication Data

US 2014/0016863 A1 Jan. 16, 2014

Related U.S. Application Data

(60) Provisional application No. 61/668,922, filed on Jul. 6, 2012, provisional application No. 61/672,168, filed on Jul. 16, 2012, provisional application No. 61/712,625, filed on Oct. 11, 2012, provisional application No. 61/683,603, filed on Aug. 15, 2012.

(51) Int. Cl.
*G06K 9/00* (2006.01)
*G06F 17/30* (2006.01)
*G06K 9/46* (2006.01)

(52) U.S. Cl.
CPC .......... *G06F 17/3025* (2013.01); *G06K 9/4652* (2013.01); *G06K 9/4676* (2013.01)

(58) Field of Classification Search
None
See application file for complete search history.

(56) References Cited

U.S. PATENT DOCUMENTS

| | | | |
|---|---|---|---|
| 6,608,942 B1 * | 8/2003 | Le | 382/279 |
| 2004/0120575 A1 | 6/2004 | Cheng | |
| 2005/0100221 A1 | 5/2005 | Li et al. | |
| 2007/0237426 A1 * | 10/2007 | Xie et al. | 382/305 |
| 2008/0089615 A1 | 4/2008 | Shiiyama | |
| 2010/0064254 A1 * | 3/2010 | Atsmon et al. | 715/810 |

FOREIGN PATENT DOCUMENTS

| | | |
|---|---|---|
| KR | 1020090109215 A | 10/2009 |
| KR | 1020120001847 A | 1/2012 |

OTHER PUBLICATIONS

International Search Report dated Oct. 22, 2013 in connection with International Patent Application No. PCT/KR2013/006017, 3 pages.

* cited by examiner

*Primary Examiner* — Eueng-Nan Yeh

(57) ABSTRACT

A method comprises computing a color factor value indicating an amount of color gradients in at least one color channel from the query image. The method comprises combining the color-keypoints with the gray-keypoints when the color factor value is greater than a threshold. A method for performing a visual search comprises extracting a plurality of local descriptors from a query image and then selecting a subset of them based on various criteria's such as visual meaning score. A method comprises aggregating each mean vector for each visual codeword from distances between each visual codeword and local descriptors. The method comprises aggregating variance vector for each visual codeword from the distance between each visual codeword, and local descriptors. The method comprises transmitting aggregated mean vector information and aggregated variance vector information to a search server for efficient image retrieval.

15 Claims, 13 Drawing Sheets
(7 of 13 Drawing Sheet(s) Filed in Color)

GRAYSCALE

RED

GREEN

BLUE

APPARATUS AND METHOD FOR PERFORMING VISUAL SEARCH

CROSS-REFERENCE TO RELATED APPLICATION(S) AND CLAIM OF PRIORITY

The present application claims priority to U.S. Provisional Patent Application Ser. No. 61/668,922, filed Jul. 6, 2012, entitled "METHOD FOR IMAGE SEARCH FROM LOCAL DESCRIPTORS WITH VISUAL MEANING SCORE", U.S. Provisional Patent Application Ser. No. 61/672,168, filed Jul. 16, 2012, entitled "METHOD FOR IMAGE SEARCH FROM LOCAL DESCRIPTORS USING COLOR INFORMATION", U.S. Provisional Patent Application Ser. No. 61/712,625, filed Oct. 11, 2012, entitled "METHOD FOR IMAGE SEARCH FROM LOCAL DESCRIPTORS USING COLOR INFORMATION", and U.S. Provisional Patent Application Ser. No. 61/683,603, filed Aug. 15, 2012, entitled "QUANTIZATION ERROR AND FOREGROUND EXTRACTION BASED LOCAL DESCRIPTOR SELECTION, AND VARIANCE AGGREGATION FOR GLOBAL DESCRIPTORS". The content of the above-identified patent documents is incorporated herein by reference.

TECHNICAL FIELD

The present application relates generally to methods and apparatuses for visual search and, more specifically, to a local descriptor selection and a global descriptor generation.

BACKGROUND

Visual search requires two steps in the retrieval part: (i) using the global descriptors for the query image to shortlist the database images, and (ii) by using the local descriptors within a geometric verification step, calculating the matching scores between the query image and all the database images in the retrieved shortlist.

Currently, MPEG standardizes a test model for Compact Descriptors for Visual Search (CDVS) with improved performance.

SUMMARY

A method for visual search is provided. The method includes extracting gray-keypoints from a grayscale of a query image. The method further includes computing a color factor value indicating an amount of color gradients in at least one color channel from the query image. The method includes extracting color-keypoints from at least one color channel when the value of color factor value is greater than a predetermined threshold. The method further includes combining the color-keypoints with the gray-keypoints.

An apparatus for performing a visual search is provided. The apparatus includes a controller configured to extract gray-keypoints from a grayscale of a query image. The controller is further configured to compute a color factor value indicating an amount of color gradient in at least one color channel from the query image. The controller is configured to extract color-keypoints from at least one color channel when the value of the color fact is greater than a predetermined threshold. The controller is further configured to combine the color-keypoints with the gray-keypoints.

A method for performing a visual search is provided. The method includes extracting gray-keypoints from a grayscale of a query image. The method further includes selecting a plurality of local descriptors whose scale is greater than a predetermined size. The method includes calculating a convex hull of the selected local descriptors. The method further includes distinguishing local descriptors which are located within the convex hull from the other local descriptors.

A method for performing a visual search is provided. The method includes extracting local descriptors from a query image. The method further includes computing a visual meaning score based on a distance between each local descriptor and a closest visual word. The method includes calculating a score for each local descriptor based on the visual meaning score. The method includes selecting at least one local descriptor based on the score.

A method for performing a visual search is provided. The method includes extracting a plurality of local descriptors from a query image. The method includes categorizing local descriptors matching each visual word as positive class, and non-matching local descriptors as negative class. The method further includes calculating a ratio of sizes of the positive class and the negative class for each visual word. The method includes weighting higher the local descriptors in the positive class in proportion to the ratio.

A method for performing a visual search is provided. The method includes extracting a plurality of local descriptors from a query image. The method further includes selecting m of local descriptors where m is greater than a transmission bitrate. The method includes obtaining each quantizing error from quantizing each selected local descriptor. The method further includes assigning scores to each selected local descriptor based on each quantizing error. The method includes re-selecting local descriptors based on the scores.

A method for performing a visual search is provided. The method includes extracting a plurality of local descriptors from a query image. The method includes aggregating each mean vector for each visual codeword from residuals between each visual codeword and local descriptors. The method further includes aggregating variance vector for each visual codeword from each mean vector. The method includes transmitting aggregated mean vector information and aggregated variance vector information in a global descriptor to a search server.

An apparatus for performing a visual search is provided. The apparatus includes a controller configured to extract a plurality of local descriptors from a query image. The controller is configured to aggregate each mean vector for each visual codeword from residuals between each visual codeword and local descriptors. The controller is further configured to aggregate variance vector for each visual codeword from each mean vector. The controller is configured to transmit aggregated mean vector information and aggregated variance vector information in a global descriptor to a search server.

An apparatus for performing a visual search is provided. The apparatus includes a controller configured to receive aggregated mean vector information and aggregated variance vector information from a client device. The controller is further configured to retrieve each mean vector for each visual codeword from mean vector information. The controller is configured to retrieve each variance vector for each visual codeword from the variance vector information, using each mean vector. The controller is configured to search for a matching image, using each mean vector and each variance vector for each visual codeword.

A method for performing a visual search is provided. The method includes receiving aggregated mean vector information and aggregated variance vector information from a client device. The method further includes retrieving each mean vector for each visual codeword from mean vector information. The method includes retrieving each variance vector for each visual codeword from the variance vector information, using each mean vector. The method further includes searching for a matching image, using each mean vector and each variance vector for each visual codeword.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The patent or application file contains at least one drawing executed in color. Copies of this patent or patent application publication with color drawing(s) will be provided by the Office upon request and payment of the necessary fee. For a more complete understanding of the present disclosure and its advantages, reference is now made to the following description taken in conjunction with the accompanying drawings, in which like reference numerals represent like parts.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged visual search technologies.

The following documents and standards descriptions are hereby incorporated into the present disclosure as if fully set forth herein: CDVS, "Description of Core Experiments on Compact Descriptors for Visual Search", N12551. San Jose, Calif., USA: ISO/IEC JTC1/SC29/WG11, February 2012 (REF 1); S. Lepsoy, G. Francini, G. Cordava and P. P. Gusmao, "*Statistical modeling of outliers for fast visual search*", in Proc. IEEE Workshop on Visual Content Identification and Search, July 2011 (REF 2); ISO/IEC JTC1/SC29/WG11/M 22672, Telecom Italia's response to the MPEG CfP for Compact Descriptors for Visual Search, Geneva, CH, November 2011 (REF 3); CDVS, "Evaluation Framework for Compact Descriptors for Visual Search", N12202, Turin, Italy: ISO/IEC JTC1/SC29/WG11, 2011 (REF 4); CDVS, "Examples of feature selection to boost retrieval performance", M23938, San Jose, Calif., USA: ISO/IEC JTC1/SC29/WG11, February 2012 (REF 5); CDVS, "Improvements to the Test Model Under Consideration with a Global Descriptor", M23938, San Jose, Calif., USA: ISO/IEC JTC1/SC29/WG11, February 2012 (REF 6); D. Chen, S. Tsai, V. Chandrasekhar, G. Takacs, H. Chen, R. Vedantham, R. Grzeszczuk and B. Girod, "Residual enhanced visual vectors for on-device image matching", IEEE Asilomar Conference on Signals, Systems and Computers, November 2011 (REF 7); D. Lowe, "Distinctive Image Features From Scale-Invariant Keypoints", International Journal of Computer Vision, vol. 60, pp. 91-110, November 2004 (REF 8); J. Stöttinger, A. Hanbury, N. Sebe and T. Gevers, "Sparse Color Interest Points for Image Retrieval and Object Categorization", IEEE Transactions on Image Processing (TIP), 2012 (REF 9); K. E. A. van-de-Sande, T. Gevers and C. G. M. Snoek, "Evaluating Color Descriptors for Object and Scene Recognition", IEEE Transactions on Pattern Analysis and Machine Intelligence, volume 32 (9), pages 1582-1596, 2010 (REF 10); "Telecom Italia's response to the MPEG CfP for Compact Descriptors for Visual Search", ISO/IEC JTC1/SC29/WG11/M22672, Geneva, CH, November 2011 (REF 11); "CDVS Improvements to the Test Model Under Consideration with a Global Descriptor", M23938, San Jose, Calif., USA: ISO/IEC JTC1/SC29/WG11, February 2012 (REF 12); and "Test Model 3: Compact Descriptor for Visual Search", ISO/IEC/JTC1/SC29/WG11/W12929, Stockholm, Sweden, July 2012 (REF 13).

Figure 1:
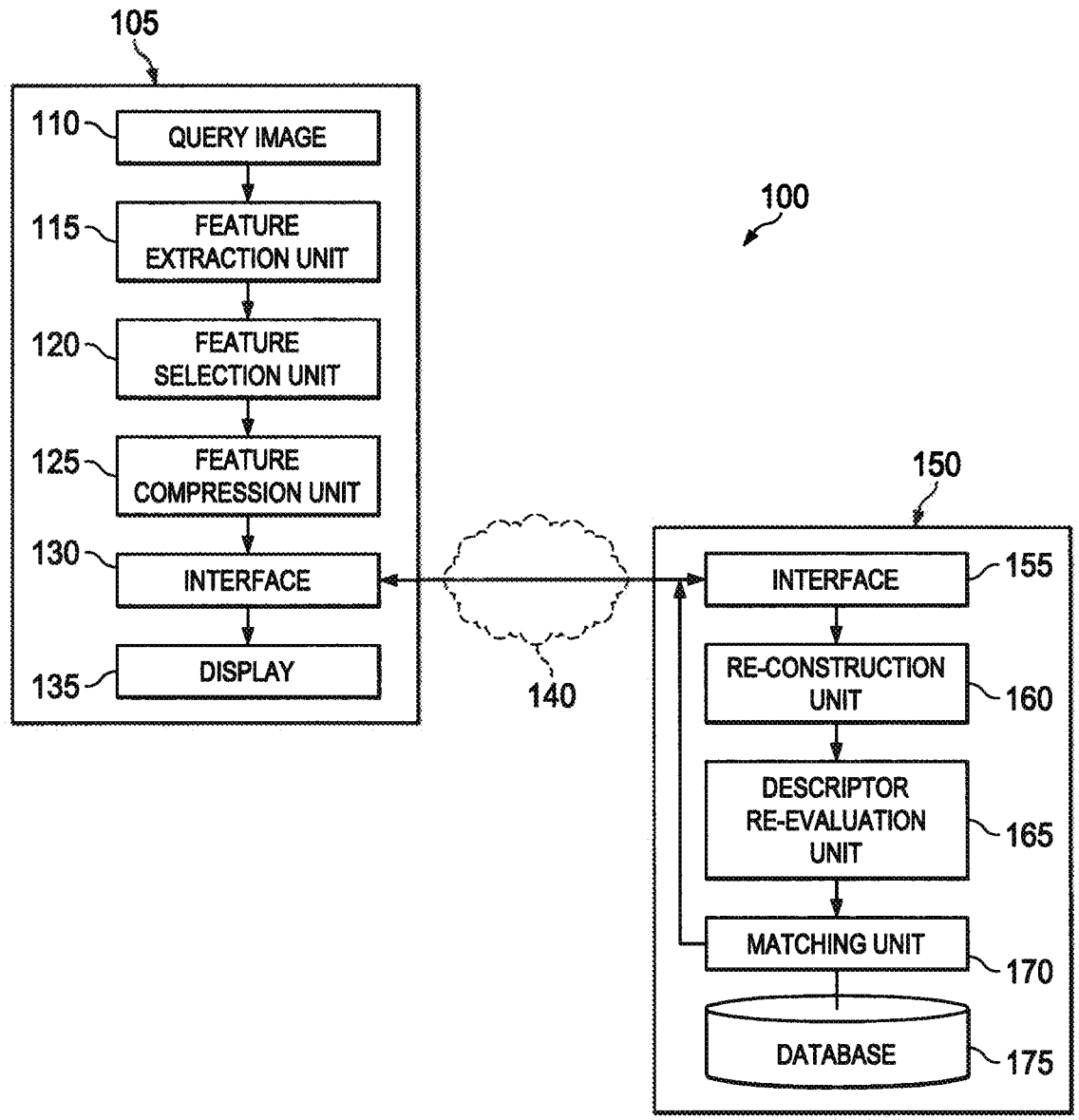
FIG. 1 illustrates a high-level block diagram of a visual search system that implements a visual search system according to embodiments of the present disclosure.

FIG. 1 illustrates a high-level block diagram of a visual search system 100 according to embodiments of the present disclosure. The visual system 100 includes components such as feature extraction, quantization, transmission and matching, as described below. The embodiment of the visual search system 100 shown in FIG. 1 is for illustration only. Other embodiments of visual search system could be used without departing from the scope of the present disclosure.

The visual search system 100 includes a client device 105, a visual search server 150 and a network 140. Client device 105 represents any suitable portable telecommunication device capable of communicating with a visual search server, such as a cellular or mobile phone or handset, tablet, or laptop. Visual search server 150 represents any suitable server device capable of communicating with a client device via a packet-switched network. After receiving query data, visual search server 150 implements a visual search algorithm to identify matching data to query data. In some instances, visual search server can include a database server storing a large amount of images and a search algorithm.

The client device 105 also includes processing circuitry, such as a feature extraction unit 115, a feature selection unit 120, a feature compression unit 125, an interface 130, and a display 135. Feature extraction unit 115 extracts features from query image data in the form of a histogram and quantizes these histograms as types. The query image 110 can be captured using any suitable image capture device such as a camera included within client device 105. Alternatively, client device 105 can obtain query image 110 from any network with another computing device.

Feature extraction unit 115 can detect keypoints, where a keypoint refers to a region or patch of pixels around a particular sample point or pixel in image data that is potentially interesting from a geometrical perspective. Then, feature extraction unit 115 extracts feature descriptors (i.e., local descriptors) describing the keypoints from the query data. The feature descriptor can include, but is not limited to, a location, one or more orientations, directions, a local image gradient, or a peak value.

Feature extraction unit 115 then forwards the feature descriptors to feature selection unit 120. The feature selection unit 120 ranks the feature descriptors and selects some feature descriptors with high ranks.

Feature compression unit 125 compresses selected feature descriptors, such as local descriptors. The feature compression unit 125 compresses the selected descriptors by performing, for example, quantization processes.

Interface 130 can be any suitable interface capable of communicating with visual search server 150 via network 140, including wired and wireless interfaces such as a wireless cellular interface.

Display 135 can be any suitable display unit capable of displaying images including, for example, a liquid crystal display (LCD) device, a plasma display device, a light emitting diode (LED) display device, an organic LED (OLED) display device, or any other type of display device.

Visual search server 150 includes an interface 155, a feature re-construction unit 160, a matching unit 170 and a database 175 containing a large amount of images and/or video and their feature descriptors Interface 155 can be any type of interface capable of communicating with a network and receives the compressed local and global descriptors.

Re-construction unit 160 decompresses compressed feature descriptors to reconstruct the feature descriptor including local and global descriptors.

Descriptor re-evaluation unit 165 re-evaluates the feature descriptors and rank the feature descriptors based on re-evaluation.

Matching unit 170 performs feature matching to identify one or more features or objects in image data based on the reconstructed and ranked feature descriptors. Matching unit 170 can access a database 175 containing a large amount of images and/or video and their descriptors, to perform the identification process. Matching unit 170 returns a result of the identification process to the client device via interface.

Figure 2:
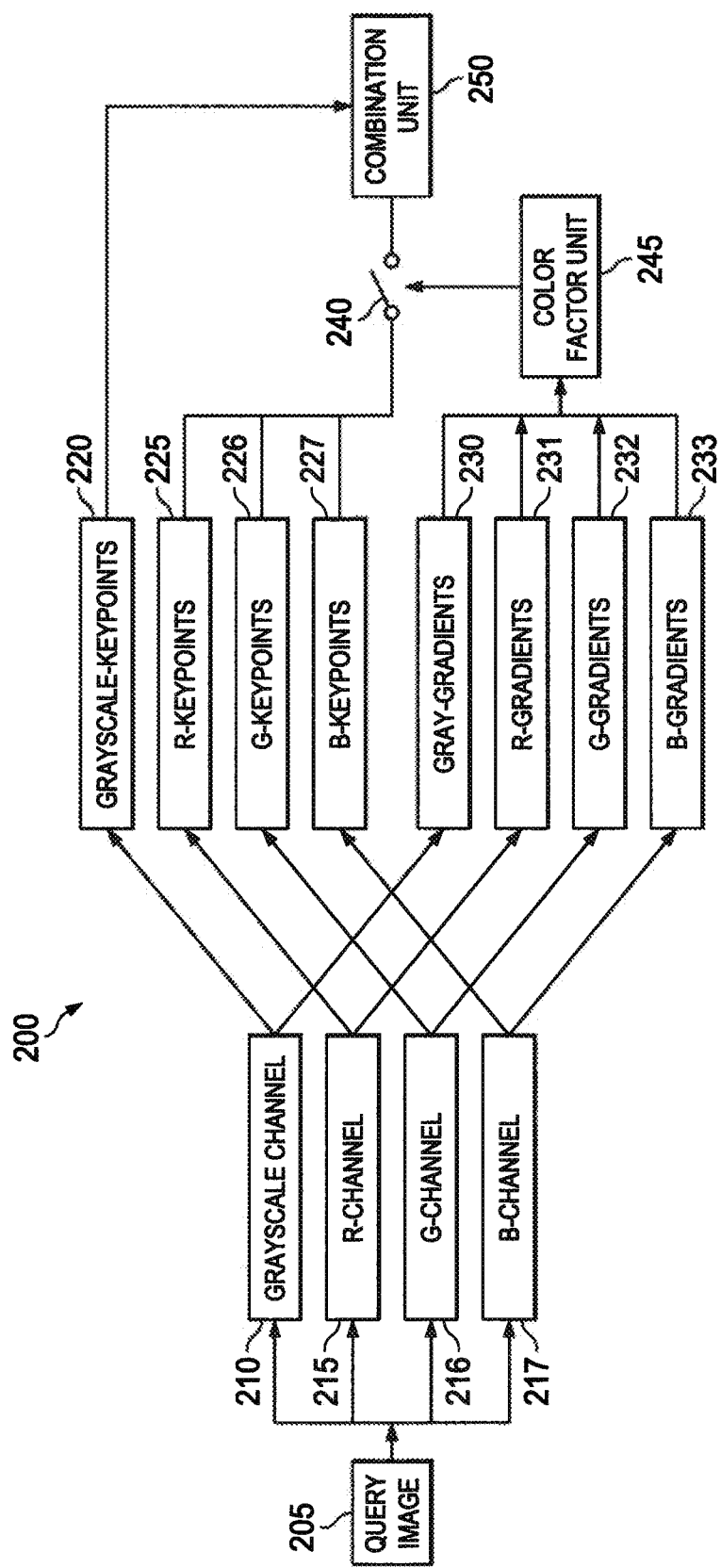
FIG. 2 illustrates a high-level block diagram of a feature extraction module utilizing a color factor according to embodiments of the present disclosure.
Figure 3A:
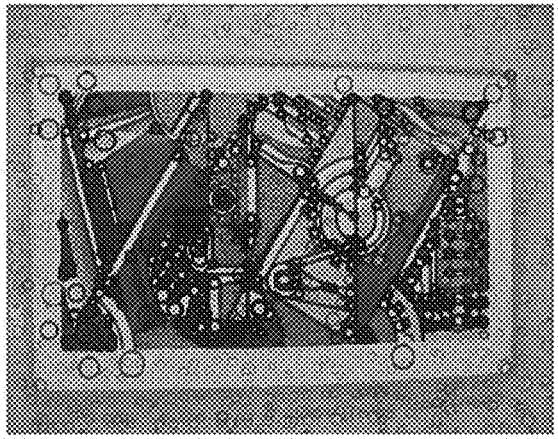
FIGS. 3A, 3B, 3C and 3D illustrate keypoints extracted from gray and multiple color channels; grayscale, red, green, and blue, according to embodiments of the present disclosure.
Figure 3B:
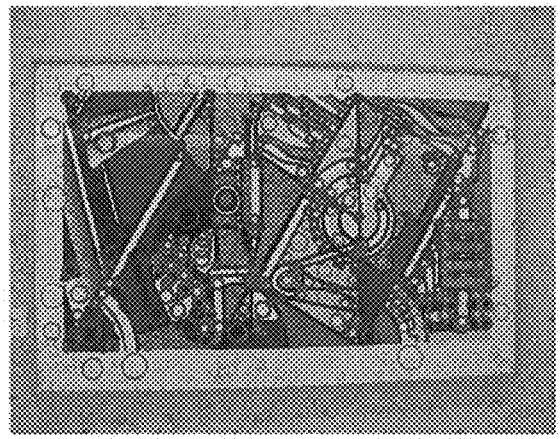
Figure 3C:
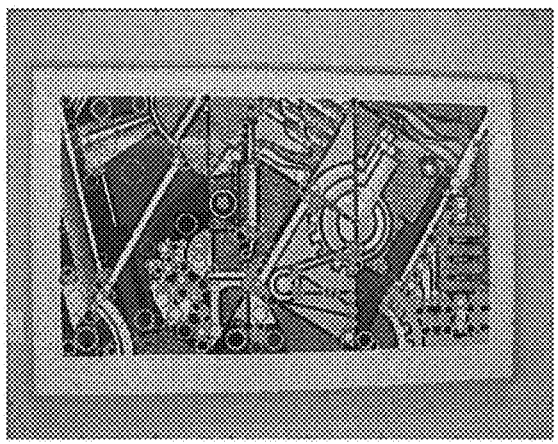
Figure 3D:
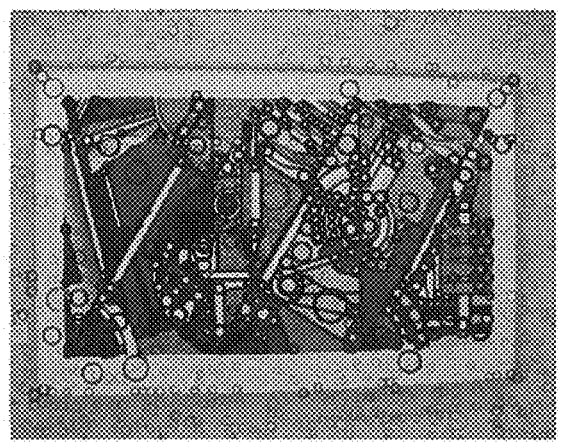

FIG. 2 illustrates a high-level block diagram of a feature extraction module 200 utilizing a color factor according to embodiments of the present disclosure. The embodiment of the feature extraction module 200 shown in FIG. 2 is for illustration only. Other embodiments of feature extraction system could be used without departing from the scope of the present disclosure.

The feature extraction module 200 includes processing circuitry such as a gray keypoints unit 220, color keypoint units 225-227, gray and color gradients units 230-233, a color factor unit 245, and a combination unit 250. The module 200 further includes a switch 240 to activate the color keypoint units 225-227 based on the value of the color factor.

Gray keypoint unit 220 extracts keypoints with their associated local descriptors from the grayscale channel 210 of the query image 205 using, for example, the Scale Invariant Feature Transform (SIFT) algorithm. Color keypoint units 225-227 extract the keypoints with their associated local descriptors separately from the different color channels, for example, a red channel 215, a green channel 216, and a blue channel 217 from a query image 205. In order for the extraction procedure to work effectively on different channels, the feature extraction module can normalize all the channels to have values in the range of 0 to 255.

As an example, FIGS. 3A to 3D illustrate keypoints extracted from gray channel and multiple color channels including red, green, and blue. The centers of the circles in the figures show the locations of the descriptors and the radii of the circles are proportional to the scale value of the descriptors. The keypoints from different images are significantly correlated in terms of their location, scale and orientation. Although the keypoints are correlated, there are notable differences between the peak values of the keypoints in different color channels.

Color factor unit 245 calculates the color factor values indicating the amount of color gradients 231-233 in the image that is associated with individual color channels. Color factor unit 245 computes the color factor mathematically as defined below. If the computed color factor is greater than a predetermined threshold, the switch 240 turns on so that the individual Red (R), Green (Gn), and Blue (B) color channels 225-227 are processed in addition to the grayscale channel for extraction of keypoints and their associated local descriptors. The keypoints extracted from the R, Gn, and B channels (also referenced as RGB channels) are checked for possible inclusion in the set of keypoints extracted from the grayscale image.

For a monochromatic (i.e., gray) query image, the color factor is zero, and, thus, color keypoint units are turned off. It is noted that the color factor categorizes the databases into two parts. The processing of the first part, which consists of images with color factors greater than the fixed threshold, involves extraction of descriptors from color channels, whereas processing the remaining portion of the database only involves extraction of descriptors from the grayscale image.

Combination unit 250 merges the keypoints extracted from these different channels 225-227 together into a single pool of keypoints. Combined key points are further passed through a compression procedure using vector quantization before being transmitted to the server.

The color factor value is calculated as follows: first, the gradient images are extracted from each of the color channels using Sobel kernel K. The gradient image (G) for an image I is computed by Equations 1-3:

$$G_x = K'*I \quad (1)$$

$$G_y = K*I \quad (2)$$

$$G = \sqrt{G_x^2 + G_y^2} \quad (3)$$

where the operator '*' represents image convolution.

Then, color factor can be calculated by Equation 4:

$$C = \sum \left| G(x,y) - \frac{\sum G_i(x,y)}{n} \right| / (h*w) \quad (4)$$

where h is the image height, w is the image width, $G_i$ is the gradient image computed from the i-th channel and there are in all n different channels. Assuming that the gradient images are extracted from each of the red, green, and blue channels, namely, $I_r$, $I_g$, and $I_b$, and Sobel kernel K is given by:

$$K = \begin{bmatrix} -1 & -2 & -1 \\ 0 & 0 & 0 \\ 1 & 2 & 1 \end{bmatrix}. \quad (5)$$

The color factor, C for red, green, and blue channels is computed as:

$$C = \sum \left| G(x,y) - \frac{G_r(x,y) + G_g(x,y) + G_b(x,y)}{3} \right| / (h*w) \quad (6)$$

where G is gradient image computed using the grayscale image I, $G_r$ is the gradient image obtained from $I_r$, $G_g$ is obtained from $I_g$, and $G_b$ is obtained from $I_b$.

In another embodiment, the color factor is computed as:

$$C_p(x,y) = \left| G(x,y) - \frac{G_r(x,y) + G_g(x,y) + G_b(x,y)}{3} \right| \quad (7)$$

$$C = \sum_{C_p(x,y) > th} C_p(x,y)/(h*w) \quad (8)$$

where the threshold, th, can be set either as some percentile value of the $C_p$ values in the image, or it can be set to an arbitrary fixed value.

Figure 4A:
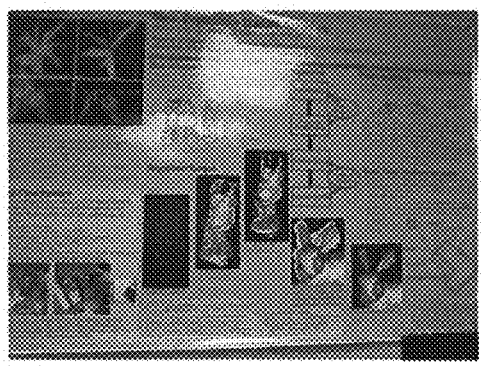
FIGS. 4A, 4B and 4C illustrate images with high and low color factor values.
Figure 4B:
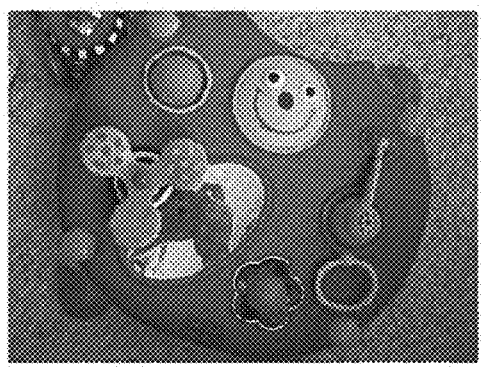
Figure 4C:
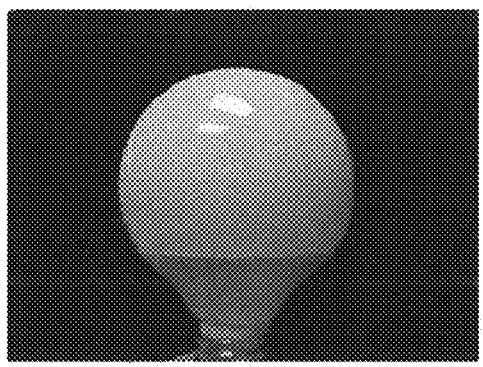

FIGS. 4A-4C illustrate images with high and low color factor values for examples. The color factor values for images 4A, 4B and 4C are 16.53, 13.07, and 0.16, respectively.

In certain embodiments, the different matching scores obtained separately for different color channels are combined as a weighted sum with the weights determined by the color factor. That is, the final match score, S is given by:

$$S = \Sigma_i w_i s_i \quad (9)$$

where $S_i$ is the matching score and $w_i$ is the weight corresponding to the $i^{th}$ channel.

In the embodiment, $$w_i = f_i(C) \quad (10)$$

where C is the color factor and $f_i$ is some uni-variate function e.g., $$f_1(C) = \frac{C}{100} \quad (11)$$

and $$f_2(C) = \frac{(100 - C)}{100}. \quad (12)$$

In certain embodiments, a non-linear function of the color factor (e.g., exponential) can be used instead of color factor to determine if the keypoints from the color channels are included in the set of keypoints sent to the server.

In certain embodiments, only the keypoint locations are obtained from the color channels, whereas the descriptor values and the keypoint selection parameters are obtained from the grayscale image.

In certain embodiments, the bandwidth is divided into grayscale, and the used color channels and specific numbers of keypoints from all the channels are sent based on the bandwidth allocated to each channel. These keypoints received at the server are matched separately for separate channels.

In certain embodiments, the color factor is appended to the global descriptor used in the Test Model or any visual search system. The global descriptor can include multiple versions of color factors such as mentioned above.

In certain embodiments, the global descriptors are separately computed for each of the color channel and appended to obtain the final global descriptor. Due to the large size of this appended global descriptor, dimensionality reduction techniques such as Linear Discriminant Analysis (LDA) or Principal Component Analysis (PCA) can be used to reduce the length of the global descriptor.

In certain embodiments, a client device sends additional bits to a search server in addition to the compressed keypoints, location coordinates and global descriptors that contain information specifying channel number for each of the keypoint.

The additional information can be used during the local keypoint matching phase in order to improve the matching accuracy. Note that a keypoint in a query image is matched with the closest keypoint in reference image if the ratio of distance between these keypoints and the distance between the query keypoint and second closest keypoint in the reference image is greater than a certain threshold. The knowledge of the channel associated with the keypoints can be used to modify this threshold such that the threshold is made more stringent if the two keypoints being matched belong to different channels.

In certain embodiments, prior to computing the color factor, the image is tessellated into multiple patches (or blocks) and the color factor is computed separately for each of these patches (or blocks). The decision to process the color channels of an image is taken based on the mean of color factors from different patches (or blocks) and/or the variance of color factor values from different patches (or blocks). For example, embodiments can extract the color-keypoints from color channels from certain patch when a color factor value on the patch is greater than mean of color factors and/or the variance of color factor values. Further, multiple tessellations of different granularity can be performed to obtain a set of variance vectors. Then a machine learning algorithm, such as a support vector machine, can be used to classify an image to be processed with or without color channel processing.

One embodiment according to the present disclosure extracts gray-keypoints from a grayscale of a query image, computes color factor values indicating an amount of color gradient in at least one color channel separately from various patches or blocks of an image, extracts color-keypoints from at least one color channel and from patches or blocks (maybe none) when the value of the color factor corresponding to that patch or block is greater than a threshold, and combines the color-keypoints with the gray-keypoints.

Another embodiment according to the present disclosure extracts gray-keypoints from a grayscale of a query image, tessellates the image into a plurality of patches, computes color factor value indicating an amount of color gradient in at least one color channel for each of the plurality of patches, extracts color-keypoints from the at least one color channel for each patch based on a mean of the color factor values and/or a variance of color factor values, and combines the color-keypoints with the gray-keypoints. In the embodiment, the tessellated patches can have different granularities.

In certain embodiments, different criteria are used to replace a keypoint in the pool of keypoints associated with different color channels with a new keypoint from a given channel. This could involve use of any new keypoint selection criteria as described in REF 13.

In certain embodiments, the color factor is computed using statistical correlation. The color factor is low for images with high statistical correlation between R, Gn, B and gray channels or Y, U and V channels and high for images with low correlations between these channels. This color factor computation has lower complexity than the preceding embodiments.

Figure 5:
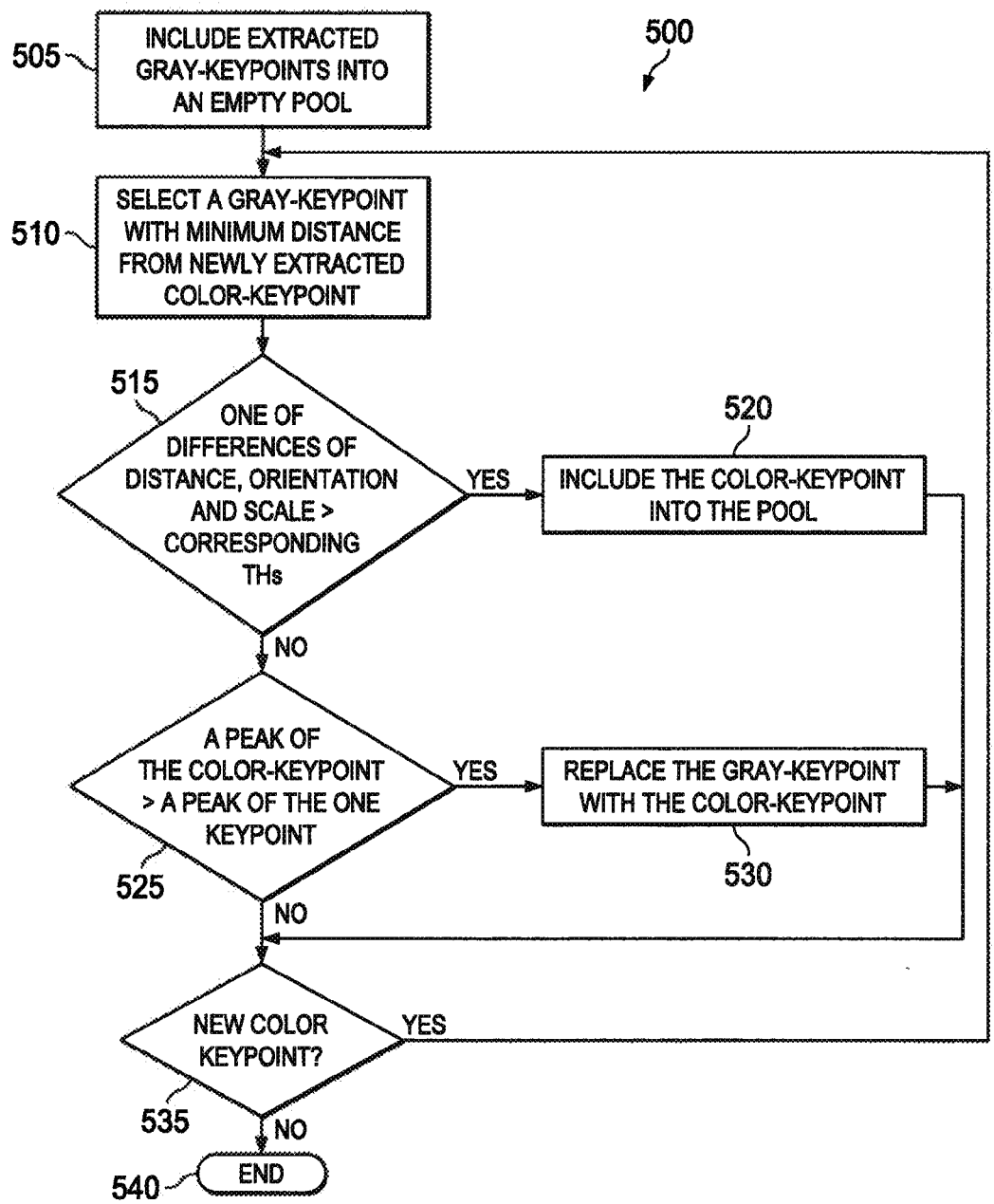
FIG. 5 illustrates a process for combining the keypoints according to embodiments of the present disclosure.

FIG. 5 illustrates a combining process of the keypoints 500 according to one embodiment of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in visual search system 100 or feature extraction module 200.

Combination of the key points at combination unit 245 starts with an empty pool. This pool includes all the keypoints extracted from the grayscale channel (step 510).

In step 510, the keypoint in the pool with minimum spatial distance to the keypoint $k_c$ is selected and named as $k_p$*.

In step 515, for each new channel, and for each keypoint in that channel, the keypoint ($k_c$) is compared with each keypoint in the pool ($k_p$). More specifically, one or more processors, such as in visual search system 200, compares the spatial distance between $k_c$ and $k_p$*, namely $d(k_c,k_p*)$, the difference between orientation and scale based keypoint selection criteria factors, denoted as $d_o$ and $d_s$ respectively, associated with $k_c$ and $k_p$* with thresholds $t_d$, $t_o$, and $t_s$.

Consequently, based on the comparison result, the pool includes $k_c$ into the pool and/or removes an existing keypoint from the pool. More specifically, if either of $d(k_c,k_p*)$, $d_o$, and $d_s$ is greater than the set threshold at step 515, the one or more processors include $k_c$ in the pool at step 520 before considering the next keypoint in the channel at step 535. Otherwise, the one or more processors check if the product of peak value based keypoint selection criteria factor at step 525, namely $p_p$, and $p_s$ for $k_c$ is greater than that for $k_p$* in which case $k_p$* is removed and $k_c$ is included into the pool at step 530. The process is repeated for each color keypoint.

An example pseudo code for the combination process according to the present disclosure is provided as follows:
Input: Image color channels: cg (grayscale), C (set of additional channels), function extract(c) that returns keypoints extracted from channel c, functions Ro(k), Rs(k), and Rp(k) extract the orientation based, scale based and peak value based keypoint selection criteria factors for keypoint k.

---
Output: Kp: the pool of keypoints
---

```
Kp={ } // initialize pool of keypoints to empty set
Kp=Kp U extract(cg)
FOR c in C
    Kc = extract(c)
    FOR k_c in Kc
        k_p*=argmin(d(k_p, in Kp, k_c)) // k_p* is the closest point in Kp to k_c
        d_o = abs(Ro(k_p)–Ro(k_c))
        ds = abs(Rs(k_p)–Rs(k_c))
        IF d(k_p*,k_c)>t_d OR d_o>t_o OR d_s>t_s
            Kp=Kp U k_c
        ELSEIF Rp(k_c)>Rp(k_p*)
            Kp=Kp U k_c
            Kp=Kp\k_p*
        ENDIF
    ENDFOR
ENDFOR
```

Figure 6:
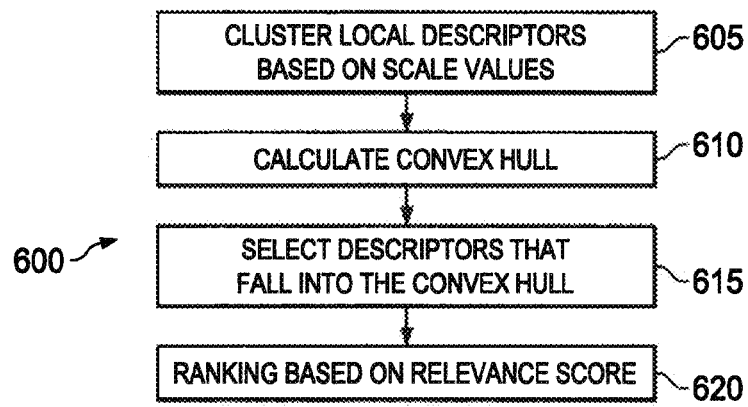
FIG. 6 illustrates a local descriptor selection process using foreground-background separation according to embodiments of the present disclosure.

FIG. 6 illustrates a local descriptor selection process 600 using foreground-background separation according to one embodiment of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in visual search system 100 or feature extraction module 200.

Although there are techniques for foreground-background separation in computer vision literature, most of them would not be appropriate for CDVS for two reasons: (i) advanced techniques would increase the computational complexity and use of resources (e.g., memory), and (ii) the goal of CDVS is not finding and isolating the foreground objects.

The local descriptor selection process 600 using foreground-background separation is based on the assumption that the foreground or the region of interest of an image would be the larger magnitude of activity and/or changes. Thus, it is possible to define the activity as low level pixel changes in an image like changes in texture or color. The magnitude of the activity represents the size of the region of pixels that is affected.

Figure 7A:
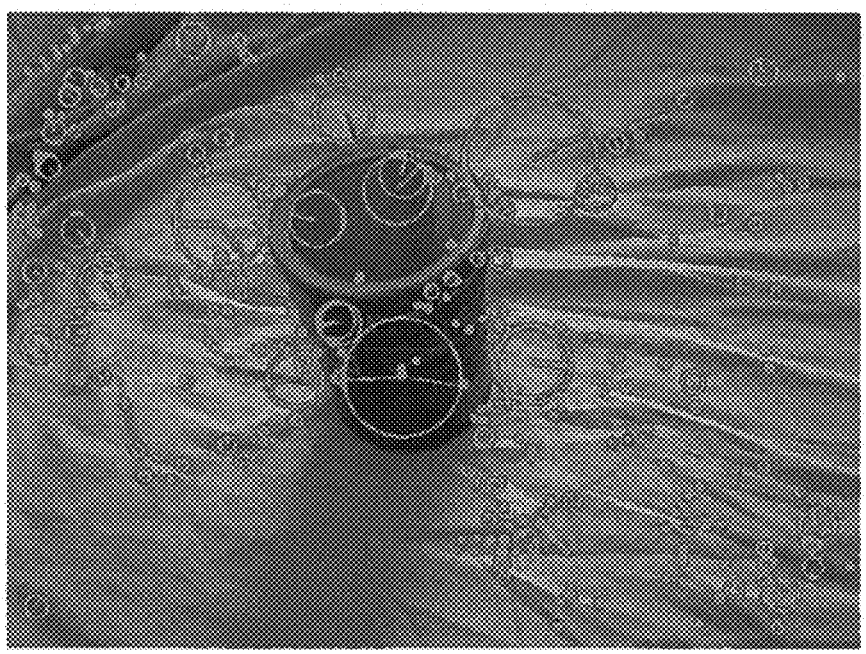
FIGS. 7A and 7B illustrate example images of foreground and background separation according to embodiments of the present disclosure.
Figure 7B:
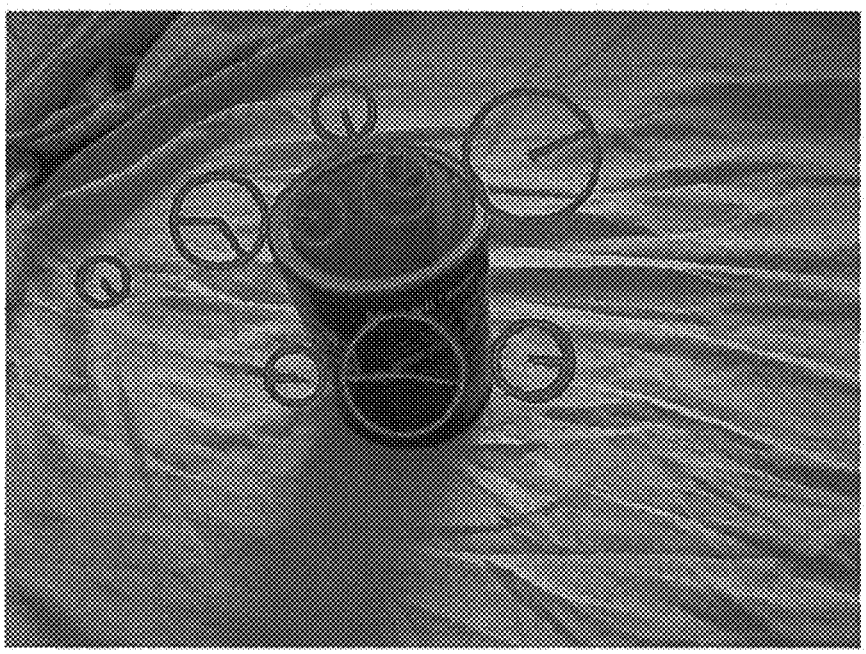

For instance, in the image shown in FIG. 7A, there are many texture changes in the images, mostly small changes due to the wrinkles on the sheet. However, these are small changes compared to the ones around the cylindrical container, which can be considered as the foreground part of the object, as shown in FIG. 7B. One way to find these regions is to check the scale values of the descriptors in different regions.

Referring back to FIG. 6, the local descriptor selection process 600 begins with one or more processors clustering the local descriptors into two groups, with a larger centroid and a smaller centroid by using the scale values (step 605). It needs to be noted that the scale value of a descriptor is proportional to the size of the change around the corresponding keypoint. In some embodiments, the process offers an adaptive solution per image compared to specifying a scale value threshold for all the images.

In step 610, the one or more processors find the convex hull of these local descriptors that fall into the cluster with a larger centroid (i.e., scale value) and make the region inside this convex hull as the foreground part of the image.

In step 615, the one or more processors give higher scores to the descriptors that fall into the region defined by the convex hull, even if they have small scale values. The way to do that is to increase the relevance scores of the local descriptors inside the convex hull so that the priority will be given to them when choosing the local descriptors to send. Once all the descriptors inside the convex hull are sent, and there is still room for more descriptors, the ones that do not fall into the convex hull will be sorted.

The visual search system 100 selects descriptors in step 615 so that small details on the foreground part of an image can still be important. With the background-foreground separation, most of the non-important local descriptors in the background can be eliminated.

Figure 8A:
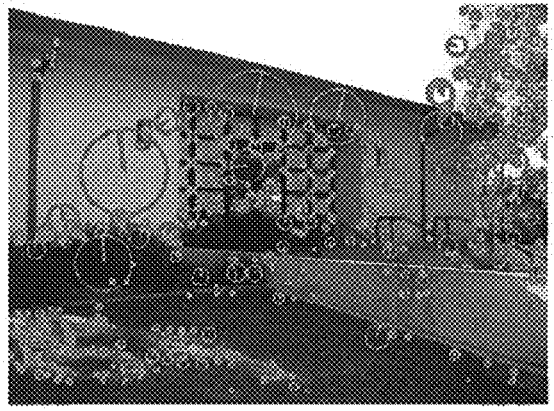
FIGS. 8A, 8B, 8C and 8D illustrate example images of foreground and background separation according to embodiments of the present disclosure.
Figure 8B:
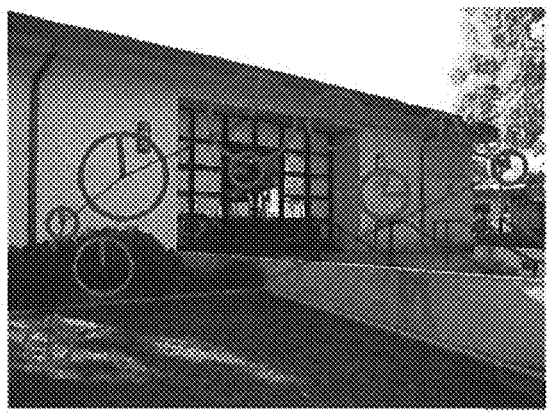

As an example of the background-foreground separation, FIG. 8A shows the local descriptors with green line extracted from an image. FIG. 8B shows the descriptors with red line, which are categorized as foreground descriptors, and the convex hull with blue line of the foreground descriptor as a result of the local descriptor selection process. The centers of the circles show the location of the descriptor and the radii or the circles are proportional to the scale value of the descriptors.

As shown in FIG. 8B, the descriptors that are on the window, although having small scale value, are retained after the process since they belong to the foreground part of the image. Since the focus of the image is the house and not the leaves, the process helps in eliminating false negatives that might be caused by the leaves or the grass.

Figure 8C:
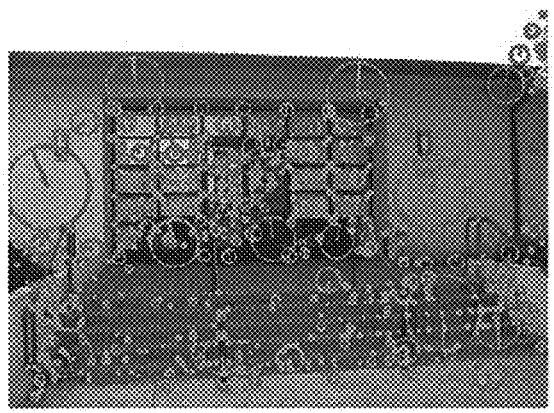
Figure 8D:
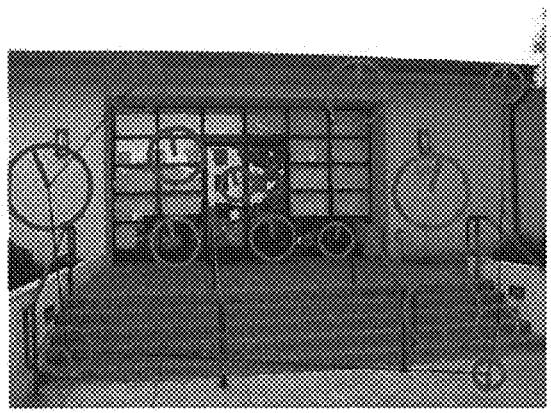

FIG. 8C shows an image where there is no clear background-foreground separation. FIG. 8D shows the foreground portion as a result of the local descriptor selection process which covers almost all the local descriptors on the image. It should be noted that in the situations where a background-foreground separation is not possible, the whole image will be chosen as the foreground portion.

Meanwhile, the relevant local descriptor selection module uses a fixed set of parameters for all images. The underlying assumption behind training of the selection parameters and finding the optimal score functions is that there is a universal pattern in all the images. All the local descriptor parameters that are being used are first quantized by a set of fixed intervals, and then the corresponding relevance score function is calculated. However, in real world applications where there is a large variety of images, it is impossible to determine a set of fixed thresholds that would work all the time.

Further, depending upon how a person takes a photograph, the region of interest (i.e., the region that is expected to be matched with another image) does not need to be in the center. Also, it might be useful to eliminate the local descriptors that have small scale values in general, particularly for the image background. Alternatively, descriptors with small scale values might be important when they provide details about the image and are in the foreground such as different trade-marks on the same shape containers (e.g., a can of COCA-COLA™ and a can of PEPSI-COLA™).

Figure 9:
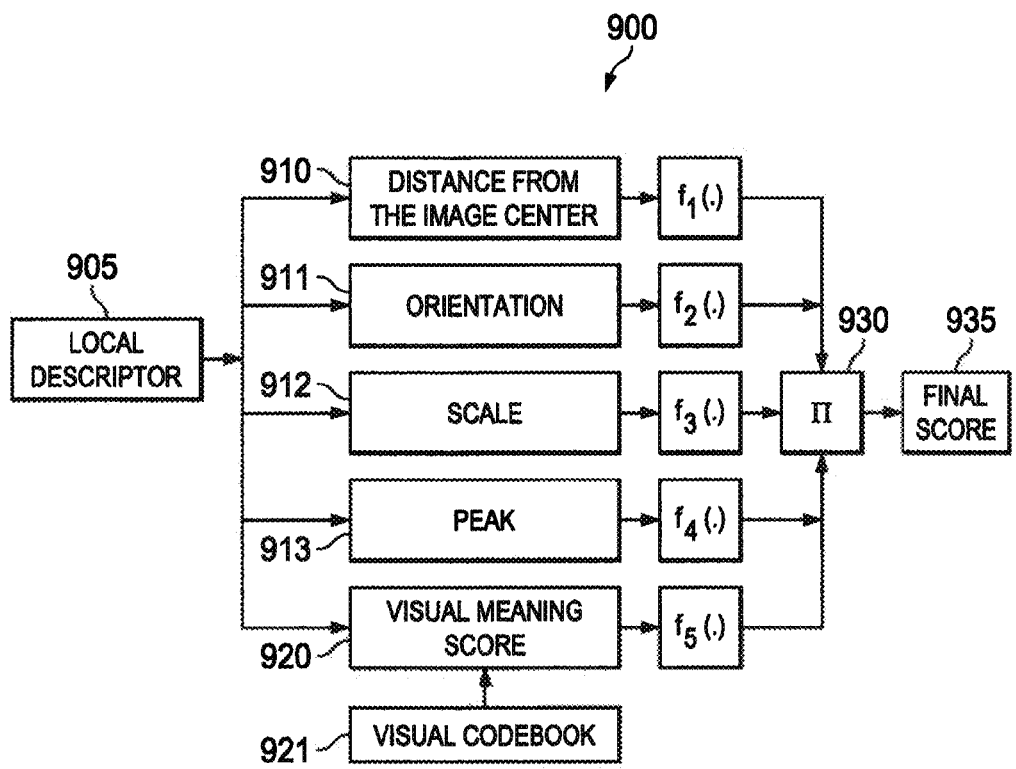
FIG. 9 illustrates a local descriptor selection module using a visual meaning score according to embodiments of the present disclosure.

FIG. 9 illustrates a local descriptor selection module using a visual meaning score according to one embodiment of the present disclosure. The embodiment of the local descriptor selection module 900 shown in FIG. 9 is for illustration only. Other embodiments could be used without departing from the scope of the present disclosure. The module depicted in the example depicted can be implemented by processing circuitry in visual search system 100 or feature extraction module 200.

For Compact Descriptors for Visual Search (CDVS), a desired number of features can be selected based on the available bandwidth as well as different criteria (i.e., locations, scale values, peak values, orientations of the local descriptors).

The local descriptor selection module 900 includes a plurality of function units yielding scores for each local descriptor based on its parameters. The plurality of functions includes $f_1(.)$ of a function of a distance from the image center 910, $f_2(.)$ of a function of an orientation 911, $f_3(.)$ of a function of a scale 912, $f_4(.)$ of a function of a peak 913, and $f_5(.)$ of a function of a visual meaning score 920.

The local descriptor selection module 900 includes combination module 930 combining these functions to calculate the final scores 935 for local descriptors. For instances, the final score can be calculated by the multiplication of the five scores calculated. Alternatively, the score $f_5(.)$ can be used in a different manner such as $(\Pi f_1 f_2 f_3 f_4 + f_5)/2$ and the like.

In certain embodiments, the visual meaning score is calculated by a function of the distance between a local descriptor and the closest visual word by referring to visual codebook 921. Under this definition, the local descriptors that are very far away from visual words will be considered as outliers and therefore, be eliminated. Visual words are learned by using a dataset that contains a large variety of images and categories. In addition to this, since a visual vocabulary can have a limited number of visual words, the visual words will be less likely to be similar to the local descriptors that appear rarely in the image dataset (rare shapes, background patches).

After the construction process, visual patches that are common throughout the image database, such as patches of common shapes (i.e., edges, corners, etc.) will be chosen as visual words. Therefore, it is natural to assume that local descriptors that are closer to the visual words in the feature space are more likely to be useful in the matching step.

Figure 10:
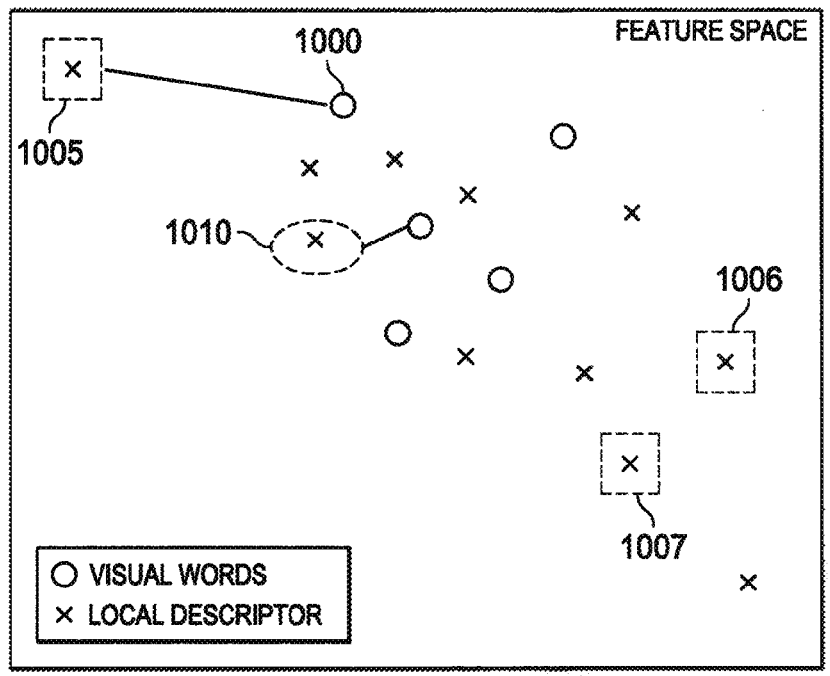
FIG. 10 illustrates the visual words (i.e., visual vocabulary) and local descriptors in the feature space according to embodiments of the present disclosure.

The visual words (i.e., visual vocabulary) and local descriptors in the feature space are illustrated in FIG. 10. The local descriptors surrounded by dotted-line squares 1005, 1006 and 1007 are more likely to be eliminated compared to the one that is surrounded by the dotted-line ellipse 1010. The reason is that the distance to the closest visual word is much bigger for the local descriptors 1005-1007 as compared to local descriptor 1010.

In certain embodiments, the distance between the local descriptor and the visual word that is closest to the local descriptor can be formulated as follows:

$$d_j = \min_{\{v_j\}_4^K} \|x - v_j\| \qquad (13)$$

where $v_j$ is the j-th visual word, x is the corresponding local descriptor, and K is the total number of visual words.

Then, the visual meaning score can be defined as $\Phi(d_j)$, where $\Phi(.)$ is a non-increasing function of $d_j$. There are a variety of functions that can be used. Some examples are:

$$\Phi(d_j) = (\exp\{-d_j/\Sigma_i d_i\})^n \quad (14)$$

where n is a positive number (for example n=0.5), $$\Phi(d_j) = (\exp\{-d_j/(\Sigma_i d_i) - d_j)\})^n, \quad (15)$$

where n is a positive number (for example n=0.5), and $$\Phi(d_j) = (c - b \cdot d_j)^n, \quad (16)$$

where n is a positive number and b, c are two constants.

Once the structure of the function $f_5(.)$ is chosen as one of the $\Phi(.)$ above, the function parameters, together with other score functions based on the other parameters (distance from the center, scale, orientation and peak) can be learned by training on the matching and non-matching images from an independent dataset.

Also, $f_5(.)$ can alternatively be defined as a piece-wise function (similar to the one used in the TM) from the function $\Phi(.)$ according to Equation 17:

$$f_5(d_f) = \begin{cases} c_1 & t_1 < \Phi(d_j) < t_2 \\ c_2 & t_2 < \Phi(d_j) < t_3 \\ \vdots & \vdots \\ c_q & t_q < \Phi(d_j) < t_{q+1} \end{cases} \quad (17)$$

where the parameters of the piece-wise function can be learnt by training on matching and non-matching image pairs from a training dataset. In the above expression, $t_1$ to $t_{q+1}$ can be the boundaries of quantization intervals (for example, from 0 to 1), and $c_i$ (i=1 ... q) can be some positive weights that can be given to each local descriptor.

Figure 11A:
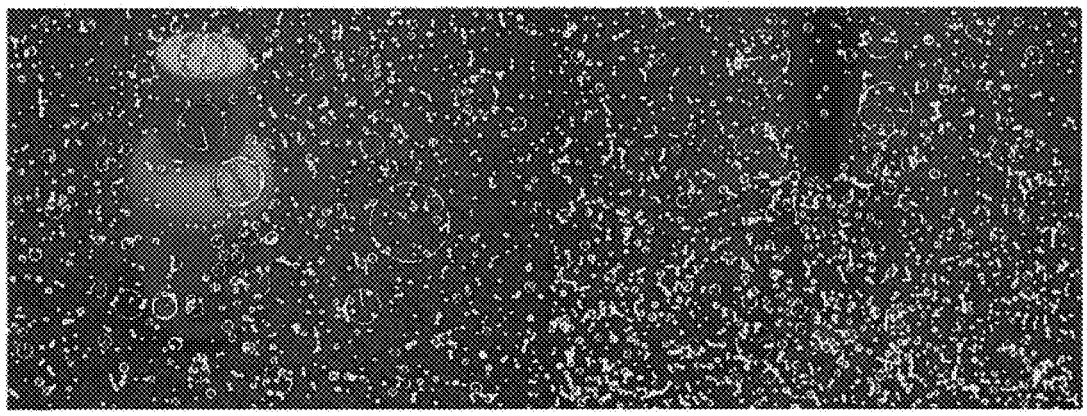
FIGS. 11A and 11B illustrate example images of local descriptors extracted from the images according to embodiments of the present disclosure.

FIG. 11A shows that the local descriptors that are extracted from two images from the object's dataset are falsely matched by the relevant local descriptor selection module because of the fact that they share the same background.

Figure 11B:
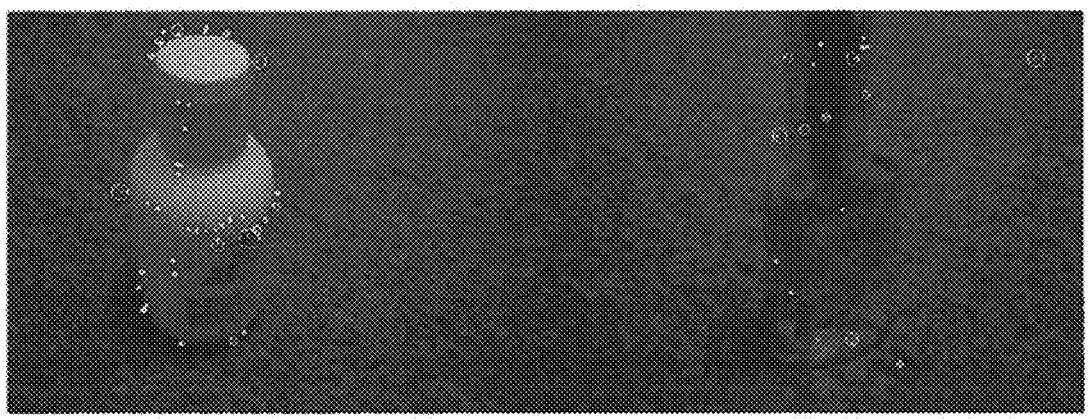

FIG. 11B shows the local descriptors that are selected by using the visual meaning score. It is observed that almost all local descriptors extracted from the background of the images in FIG. 11A are eliminated, and the ones extracted from the more meaningful part (i.e., foreground) of the image are retained in FIG. 11B. It is no coincidence that the descriptors that are selected belong to the part of the image where there is a large amount of energy (i.e., edges, corners). A similar argument can be made about other parameters such as peak value of the SIFT descriptors. However, it is noted that there can be parts of a background where descriptors can have high peak values, just like the background in these images.

The visual meaning score is not only implicitly looking for visual patches with high energy but also visual patches that are generally popular or common within a dataset. This explains why visual meaning score is successful in eliminating local descriptors that correspond to image background. This argument can be supported by the two images given in FIG. 12.

Figure 12A:
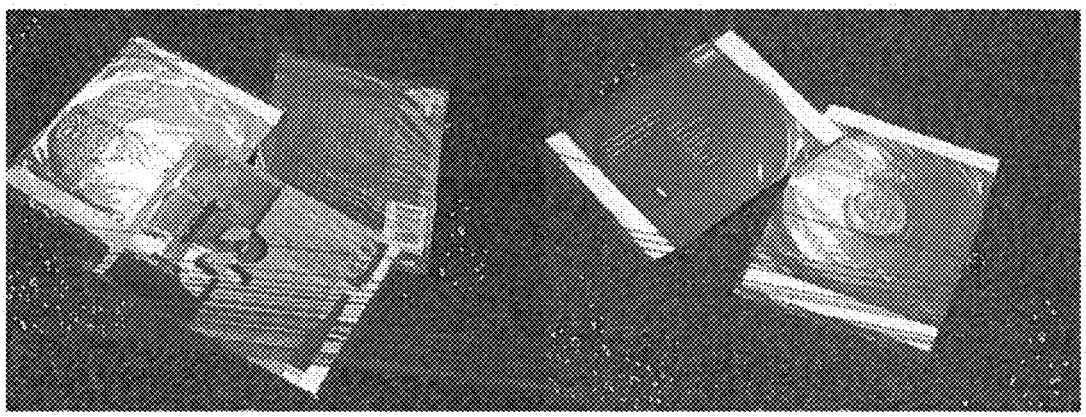
FIGS. 12A and 12B illustrate examples that are false mismatched.
Figure 12B:
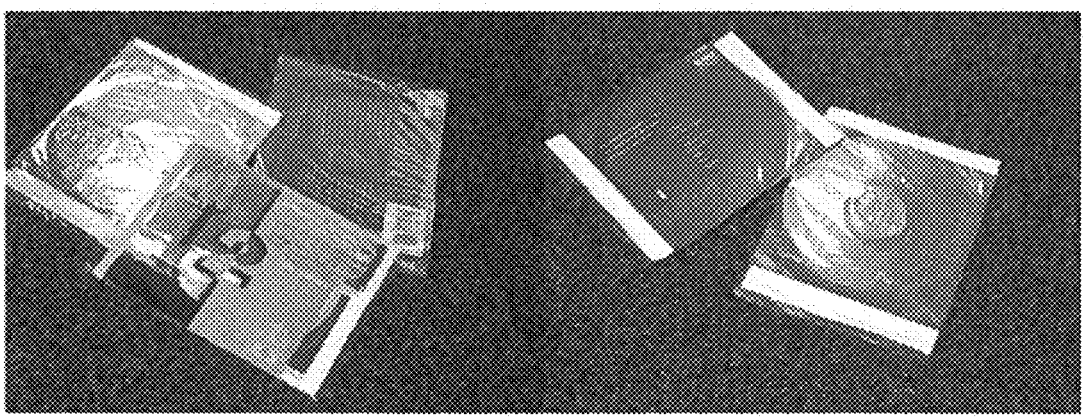

In FIG. 12A, where the SIFT-peak value is used as the local descriptor selection criterion, there is still a false match between two images of two different objects that share the same background. Alternatively, the visual meaning score based selection eliminates the background local descriptors and avoids the false match as shown in FIG. 12B.

The main difference of the visual meaning score as compared to the other parameters is that it can be considered as a mid-level feature. All other previous parameters are based on the low-level features calculated by using the local key-point and the surrounding pixels within the image. Alternatively, the visual meaning score is based on the proximity of a local descriptor to the visual vocabulary, which is assumed to contain semantic information of the dataset that it is extracted from.

For instance, if a visual vocabulary is extracted by using a dataset that contains car images, then each visual word would correspond to a visual patch related to a car image. The assumption is that any car image would be represented by using these visual words. This phenomenon has an analogy in text retrieval field: assuming each document is represented by words, the vocabulary that is extracted by using documents related to cars will contain words related to cars.

Therefore, by considering the proximity of a local descriptor to the visual vocabulary, the embodiment of the present disclosure adds semantic (i.e., a higher level) information to the descriptor selection process. For this reason, the local descriptor scoring scheme can be considered as a mid-level feature evaluation technique.

In certain embodiments, a visual meaning score can be calculated on both the mobile side and the server side without increasing the transmitted data or memory requirement on the mobile side, since it solely depends on the local descriptor itself as well as the visual vocabulary, which is already saved on the mobile device.

Alternatively, other parameters (e.g., scale, orientation, distance from the image center, peak) need to be sent in addition to the local descriptor, if they are going to be used on the server side. A local descriptor selection or re-evaluation stage on the server side is beneficial in the following two aspects: first, the initial selection on the mobile side is done under very limited resources (i.e., small number of visual words, small number of quantization level for key-point parameters). Therefore, the quality of the descriptor selection algorithm might not be optimal. Second, due to the limitations on the communication channel (size of data to be transmitted), all the local descriptors that are selected are treated equally (i.e., binary relevance flag). All these shortcomings can be improved with a re-evaluation step on the server side.

In certain embodiments, using the visual meaning score, a weighting scheme based on the relevance of the local descriptors (i.e., soft relevance flag) can also be employed to improve the matching performance as local descriptors can be efficiently evaluated by using visual meaning scores with a larger visual vocabulary size on the server side.

Adding the visual meaning score based descriptor selection does not bring a significant computational load to a client device, since the distances between the local descriptors and visual words are already being calculated in a global descriptor construction step. By using these distances, the visual meaning score can easily be calculated with simple arithmetic operations (addition multiplication, exponentials), and integrated into the local descriptor selection module without removing or changing the previous components.

In certain embodiments, the visual meaning score can be applied to the selection of low-level local and mid-level descriptors in a video search.

In certain embodiments, the visual meaning score can also be used independently for an image search and retrieval in proprietary solutions.

In certain embodiments, the visual meaning score can be applied in the image matching applications where the visual meaning score of two descriptors is incorporated in the distance metric.

Figure 13:
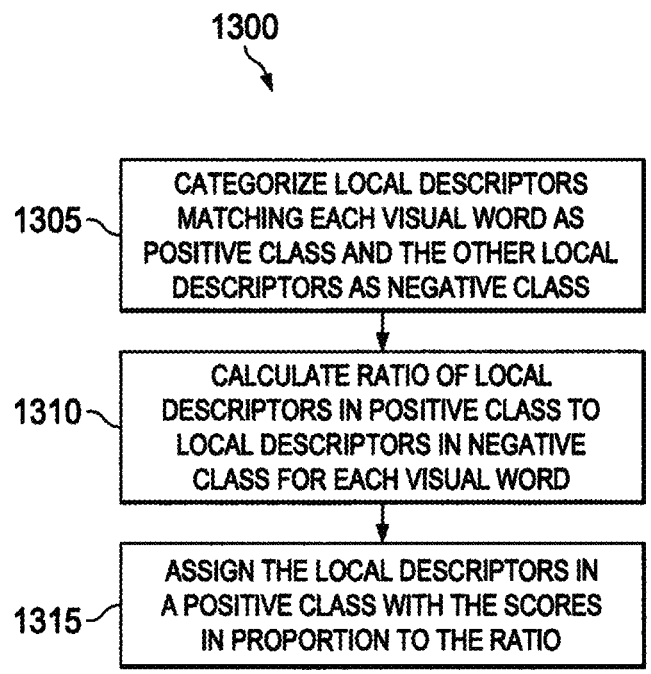
FIG. 13 illustrates a local descriptor selection process with a weighting scheme for the visual words according to embodiments of the present disclosure.

FIG. 13 illustrates a local descriptor selection process 1300 with a weighting scheme for the visual words according to one embodiment of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in visual search system 100 or feature extraction module 200.

In the embodiment, the local descriptor selection process 1300 includes a weighting scheme for the visual words in a visual vocabulary depending on how much it contributes to the matching process.

As mentioned above, a visual vocabulary is assumed to contain semantic information of the dataset that it is extracted from. Therefore, by considering the proximity of a local descriptor to the visual vocabulary, semantic (i.e., higher level) information is added to the descriptor selection process. For this reason, the local descriptor scoring scheme can be considered as a mid-level feature evaluation technique.

The local descriptor selection process 1300 is configured to find a weighting scheme for the visual words in a visual vocabulary depending on how much they contribute to the matching process. It is assumed that some visual words will be more useful for the descriptor matching task than others. For instance, in text retrieval, some popular words like "and", "or" and "the" might not be as useful as more specific words like "tax" and "budget" for economy-related documents or "ball" and "score" for sport-related documents. Moreover, some rarely used words, such as "esculent", would also not contribute much. The similar conclusion can be made for visual words. Some very common image patches (i.e., edges) or rare patches (noisy patches, outliers) would not be helpful for a matching task, since they would cause false matches and mismatches, respectively.

In certain embodiments, a visual vocabulary score for each visual word is learned from an independent image dataset, which has matching image pairs. In more detail, one or more processors executing the local descriptor selection process 1300 categorizes all the matching descriptors extracted from matching image pairs as the positive class, and all other descriptors that do not match to a descriptor in the matching images can be classified as negative class members (step 1305).

In step 1310, the corresponding visual words (i.e., closest in the feature space) should be found for each descriptor. One simple way to calculate visual vocabulary score would be to find the ratio of positive class descriptors to negative class descriptors for each visual word.

In step 1315, the process 1300 assigns the local descriptors in a positive class with the scores in proportion to the ratio. Therefore, a high ratio leads to a higher score, since it means that local descriptors that belong to that visual score are more likely to cause a correct match. The process is a kind of frequency-based approach.

More complex techniques like naïve Bayes or Support Vector Machines (SVM) can also be used to learn a proper vocabulary weighting function and to combine this with other descriptor selection parameters.

Figure 14:
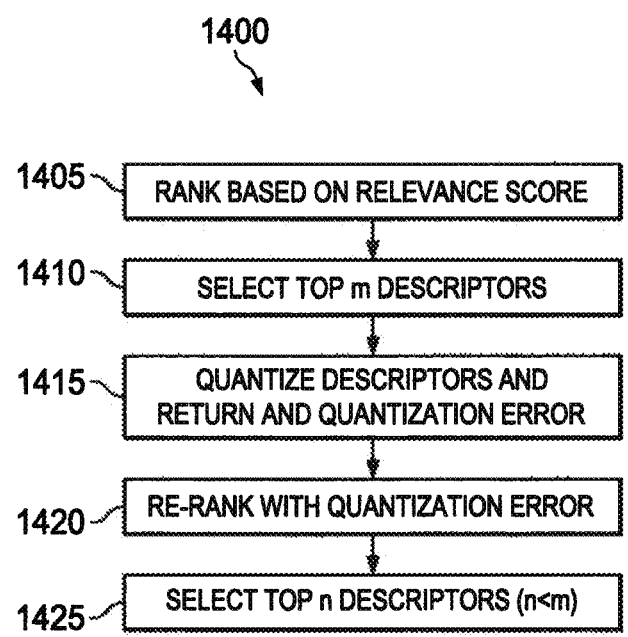
FIG. 14 illustrates a process for illustrating a local descriptor selection process using quantization error according to embodiments of the present disclosure.

FIG. 14 illustrates a local descriptor selection process 1400 using quantization error according to one embodiment of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in visual search system 100 or feature extraction module 200.

The quantization process is used for compressing and transmitting the local descriptors to the search server. One of the criteria for a quantization scheme should be to minimize the memory usage in the mobile device and to maximize the transmitted data. However, while quantization helps to increase the amount of data to be transmitted from mobile end to the server end, it may also cause some information loss on the descriptors that are transmitted due to quantization errors.

Figure 16:
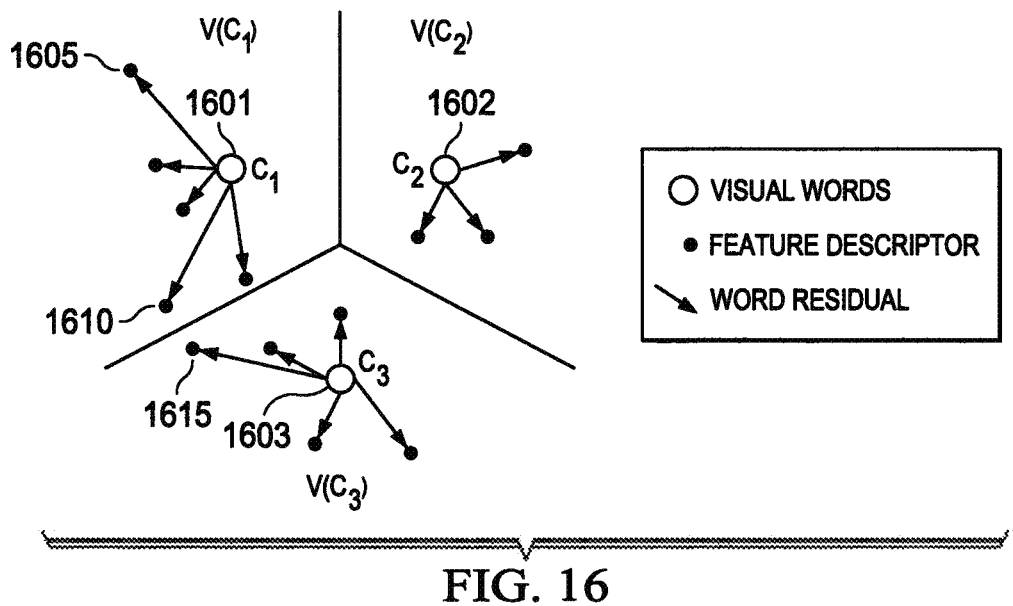
FIG. 16 illustrates an example feature space for describing a quantization error according to embodiments of the present disclosure.

As an example of quantization error, FIG. 16 illustrate the feature space, where white circles $C_1$ to $C_3$ represent cluster centers for quantization, and black circles represent local descriptors. Even though the two local descriptors 1610 and 1615 are located nearby, quantization will cause mismatch between them. Similarly, the two descriptors 1605 and 1610 are located far from each other, but quantizing them to the same cluster center $C_1$ will cause a false match.

If the quantization errors are not negligible, and they often are not, then the matching performance would be affected negatively. In other words, even if the most relevant local descriptors are sent, if the corresponding quantization errors are high, then the probability of correct matches will drop drastically. Information loss in the quantization step can increase the number of false matches and decrease the number of true matches at the same time. Therefore, the present disclosure proposes to consider the influence of the quantization error when selecting the local descriptors to be sent.

The local descriptor selection process 1400 uses the quantization error associated with each descriptor as an additional parameter for descriptor selection to reduce the number of descriptor sent with high quantization errors. Although there is no guarantee that descriptors with very small quantization errors will necessarily be useful, the descriptors with large quantization errors generally cause mismatches. The probability of a mismatch for a given descriptor will increase as the quantization error increases.

The process 1400 begins with ranking the local descriptors according to their relevance scores (step 1405). Then, the top m local descriptors will be selected (step 1410) and be sent to the quantization module. The quantization module quantizes the descriptors and returns quantization error (step 1415). The number of the selected local descriptor, m, depends on the bitrate. For example, if n is the maximum number of local descriptors that can be sent for a certain bitrate, m=a*n is chosen, where a=1.5 or 2.

After quantizing these local descriptors, the quantization (reconstruction) errors will be returned. Assuming $q_i$ is the quantization error for the $i^{th}$ local descriptor, and then a score function $f_i$ will be calculated based on $q_i$ for each local descriptor. The examples of score function $f_i$ are not limited to the following: $f_i = (c - k.q_i)^d$, where c, k and d are positive constants; $f_i = 1/(k.q_i)$, where k is a positive constant; or $f_i = \exp(-k q_i)$, where k is a positive constant. These equations are just examples of a score function, and the disclosure does not depend on a particular choice of the function.

For only the purpose of the simulations, $f_i 3 - q_i/128$ is adopted as a score function. Once the new score is calculated, it will be combined with the other parameters (location, scale, peak, orientation) to get the new relevance score and re-rank the local descriptors (step 1420). After the re-ranking process the number of descriptors will be reduced again according to the new score and the selected n descriptors (n<m) will be sent to the server.

Figure 15:
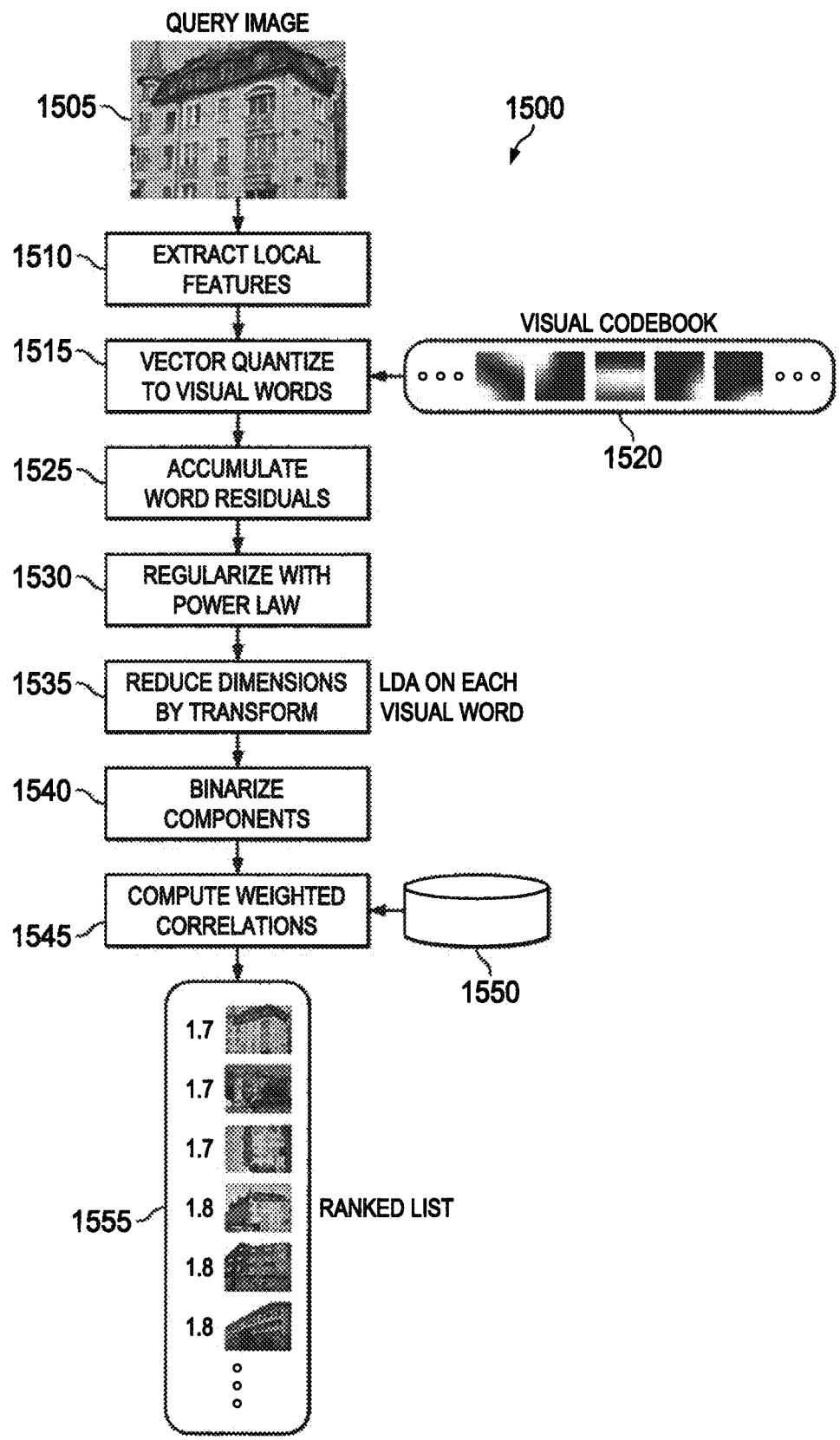
FIG. 15 illustrates a visual search process based on a global descriptor including mean aggregation information and variance aggregation information according to embodiments of the present disclosure.

FIG. 15 illustrates a visual search process 1500 based on a global descriptor including mean aggregation information and variance aggregation information according to one embodiment of the present disclosure. The embodiment illustrated in FIG. 15 is based on the Residual Enhanced Visual Vector (REVV) descriptor model. However, the present disclosure is not limited to the REVV descriptor model and can be applied to any suitable model using the global descriptors. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in visual search system 100 or feature extraction module 200.

For visual search of images and videos, it is generally beneficial to have a global representative of the image or video which can be used at low bit-rates, when all the detailed information from the local descriptors for the images and video cannot be sent to a server.

The visual search process 1500 begins with step 1510 where the local descriptors are extracted. The local descriptors in each cell are aggregated using a visual codebook 1520 in step 1515.

For example, as illustrated in FIG. 16, the white circles $C_1$ to $C_3$ represent the visual codewords and the black circles represent the local descriptors. The local descriptors in a region are aggregated, and their element-wise mean vector, $S_i$, for each visual codeword is calculated by using the Equation 17:

$$S_i = 1/N_i \sum_{j=1}^{N_i} v_{ij}. \tag{17}$$

where $N_i$ is the total number of local descriptors corresponding to visual codeword i, $v_{ij}$ is a residual between the visual codeword $c_i$ and local descriptor $x_j$ (j=1 ... $N_1$). For example $v_{ij}=(c_1-x_j)$.

To improve the performance of global descriptors, in addition to mean aggregation, the process 1500 performs the variance aggregation according to Equation 18:

$$V_i = (1/N_i \Sigma_{j=1}^{N_i}(v_{ij})^2) - (S_i)^2 \tag{18}$$

where the square operation on vectors $S_i$ and $v_{ij}$ are performed element-wise. From this operation, the process 1500 aggregates variance vector for each visual codeword from the distance between each visual codeword, and local descriptors.

Figure 17A:
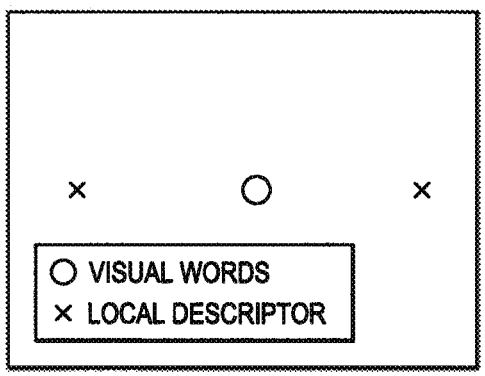
FIGS. 17A and 17B illustrate example feature spaces for describing variance aggregation according to embodiments of the present disclosure.
Figure 17B:
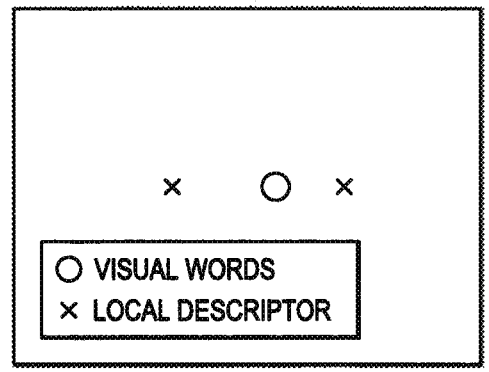

For the research on the benefit of the process, examples illustrated in FIGS. 17A and 17B are considered. The means of the residue in FIGS. 17A and 17B would be the same. However, the variances would be different. Hence, it may be advantageous to use variance information in global descriptor construction. In a similar fashion, using mean and variance aggregation together should be beneficial and improve the CDVS test model.

In certain embodiments, variance aggregation can be performed for all of the 128 dimensions independently of the local descriptors at the process of "accumulate word residuals" in step 1525.

After mean and variance aggregations, the different $S_i$ are modulated by a power law in step 1530, concatenated, and their dimensions are reduced to 32 by Linear Discriminant Analysis (LDA) in step 1535. The LDA eigenvectors are processed to be binarized at step 1540 and sent over the channel. At the search server side, the images in the database 1550 also undergo a similar process as the LDA eigenvectors, and matching is performed by computing weighted correlations in step 1545. In other words, the search server comprises a controller configured to receive aggregated mean vector information and aggregated variance vector information from a client device, retrieve each mean vector for each visual codeword from mean vector information, retrieve each variance vector for each visual codeword from the variance vector information, using each mean vector, and search for a matching image, using each mean vector and each variance vector for each visual codeword.

For Compact Descriptors for Visual Search (CDVS), the information for mean aggregations is reduced to 32 dimensional vector using LDA. Sending another 32 dimensional vector for the variance aggregation would improve the performance, but also increase the bit-rate. To avoid this increase of the bit-rate, in some embodiments, the LDA dimensionality reduction can be performed in such a fashion that a K dimensional (where K<32) vector corresponding to "mean" and a (32-K) dimensional vector corresponding to variance is obtained when LDA is applied respectively to the mean and variance words separately.

For instance, one embodiment sends a 28 dimensional vector for mean, and another 4 dimensional vector for variance. By doing this, the bit-rate will not be increased, but the performance can still be improved since more relevant information can be used from the variance aggregation. The drop in performance by ignoring the last 4 dimensions for mean would be compensated by variance aggregation.

At least some of the components in above embodiments may be implemented in software while other components may be implemented by configurable hardware or a mixture of software and configurable hardware. The configurable hardware may include at least one of a single FPGA device, processor, or ASIC, or a combination thereof.

It can be also contemplated that various combinations or sub-combinations of the specific features and aspects of the embodiments may be made and still fall within the scope of the appended claims. For example, in some embodiments, the features, configurations, or other details disclosed or incorporated by reference herein with respect to some of the embodiments are combinable with other features, configurations, or details disclosed herein with respect to other embodiments to form new embodiments not explicitly disclosed herein. All of such embodiments having combinations of features and configurations are contemplated as being part of the present disclosure. Additionally, unless otherwise stated, no features or details of any of the stent or connector embodiments disclosed herein are meant to be required or essential to any of the embodiments disclosed herein, unless explicitly described herein as being required or essential.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing a visual search, the method comprising,
   extracting at least one gray-keypoint from a grayscale of a query image;
   computing a color factor value indicating a value of color gradient in at least one color channel from the query image by a client device;

extracting at least one color-keypoint from the at least one color channel when the color factor value is greater than a predetermined threshold;

determining whether the at least one color-keypoint is significantly distinctive from a respective adjacent gray-keypoint than a threshold by the client device; and combining the least one color-keypoint with the at least one gray-keypoint when the at least one color-keypoint is significantly distinctive from the respective adjacent gray-keypoint than the threshold by the client device.

2. The method of claim 1, further comprising closing a switch to activate the extracting the at least one color-keypoint from the at least one color channel when the color factor value is greater than a predetermined threshold.

3. The method of claim 1, wherein the combining of the at least one color-keypoint comprises:

including the extracted at least one gray-keypoint into a pool;

selecting one gray-keypoint with a minimum spatial distance from each color-keypoint, out of the at least one gray-keypoint of the pool;

computing a respective difference of a spatial distance, orientation, and scale between the selected one gray-keypoint and the at least one color-keypoint; and including the at least one color-keypoint into the pool when one of the respective difference is greater than a corresponding threshold value.

4. The method of claim 3, further comprising:

replacing the selected one gray-keypoint with the at least one color-keypoint when a peak value of the at least one color-keypoint is greater than that of the selected one gray-keypoint.

5. The method of claim 1, wherein the color factor value is calculated as follows:

$$C = \sum \left| G(x, y) - \frac{\sum G_i(x, y)}{n} \right| / (h * w)$$

where $G_i$ is a gradient image computed from the $i^{th}$ channel, n is a number of the at least one color channel, h and w denote the height and width of the image, and the sum is over (x,y), and a grayscale image I is extracted from each of the at least one color channel is computed using Sobel kernel K as follows:

$G_x = K'*I$ $G_y = K*I$ $G = \sqrt{G_x^2 + G_y^2}$ where the operator '*' represents image convolution $G_x$ and $G_y$, wherein K' is a transposed matrix of K.

6. The method of claim 5, wherein the at least one color channel includes red, green, and blue channels, and the color factor value is calculated as follows:

$$C = \sum \left| G(x, y) - \frac{G_r(x, y) + G_g(x, y) + G_b(x, y)}{3} \right| / (h * w)$$

where G is a gradient image computed using the grayscale image I, $G_r$ is the gradient image obtained from the red channel, $G_g$ is obtained from the green channel, and $G_b$ is obtained from the blue channel.

7. The method of claim 1, wherein the color factor value is appended to a global descriptor transmitted to a search server.

8. An apparatus for performing a visual search, the apparatus comprising:

a controller configured to:

extract at least one gray-keypoint from a grayscale of a query image;

compute a color factor value indicating an amount of color gradient in at least one color channel from the query image;

extract at least one color-keypoint from the at least one color channel when the color factor value is greater than a predetermined threshold;

determine whether the at least one color-keypoint is significantly distinctive from a respective adjacent gray-keypoint than a threshold; and combine the at least one color-keypoint with the at least one gray-keypoint when the at least one color-keypoint is significantly distinctive from the respective adjacent gray-keypoint than the threshold, and an interface configured to communicate with a server.

9. The apparatus of claim 8, further comprising a switch configured to activate extracting the at least one color-keypoint from the at least one color channel when the color factor value is greater than a predetermined threshold.

10. The apparatus of claim 8, wherein the controller is configured to:

replace one keypoint with the color-keypoint when a peak value of the color-keypoint is greater than that of the one keypoint.

11. The apparatus of claim 8, wherein the controller is further configured to:

include the extracted at least one gray-keypoint into a pool;

select one gray-keypoint with a minimum spatial distance from the at least one color-keypoint, out of the at least one gray-keypoint of the pool;

compute a respective difference of a spatial distance, orientation, and scale between the selected one gray-keypoint and the at least one color-keypoint; and include the at least one color-keypoint into the pool when one of the respective difference is greater than a corresponding threshold value.

12. The apparatus of claim 11, wherein the controller is further configured to:

replace the selected one gray-keypoint with the at least one color-keypoint when a peak value of the at least one color-keypoint is greater than that of the selected one gray-keypoint.

13. The apparatus of claim 8, wherein the color factor value is calculated as follows:

$$C = \sum \left| G(x, y) - \frac{\sum G_i(x, y)}{n} \right| / (h * w)$$

where $G_i$ is a gradient image computed from the $i^{th}$ channel, n is a number of the at least one color channel, h and w denote the height and width of the image, and the sum is over (x,y), and a grayscale image I is extracted from each of the at least one color channel is computed using Sobel kernel K as follows:

$G_x = K'*I$ $G_y = K*I$ $G = \sqrt{G_x^2 + G_y^2}$ where the operator '*' represents image convolution of $G_x$ and $G_y$, wherein K' is a transposed matrix of K.

14. The apparatus of claim 13, wherein the at least one color channel includes red, green, and blue channels, and the color factor value is calculated as follows:

$$C = \sum \left| G(x, y) - \frac{G_r(x, y) + G_g(x, y) + G_b(x, y)}{3} \right| / (h * w)$$

where G is a gradient image computed using the grayscale image I, $G_r$ is the gradient image obtained from the red channel, $G_g$ is obtained from the green channel, and $G_b$ is obtained from the blue channel.

15. The apparatus of claim 8, wherein the color factor value is appended to a global descriptor transmitted to the server.

* * * * *